(12) United States Patent
Regueiro

(10) Patent No.: US 6,740,810 B1
(45) Date of Patent: May 25, 2004

(54) DUAL-SIDED ELECTRICAL OUTLET

(75) Inventor: Alejandro S Regueiro, White Lake, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/306,059

(22) Filed: Nov. 26, 2002

(51) Int. Cl.[7] ................................................. H05K 5/02
(52) U.S. Cl. .......................... 174/51; 174/53; 174/52.1; 174/54; 174/61; 174/64; 174/67; 174/58; 439/527; 439/535; 439/654; 220/3.2; 220/3.4; 220/3.6; 220/3.3; 220/3.7; 220/3.8; 296/166
(58) Field of Search ........................... 174/51, 53, 52.1, 174/54, 58, 59, 61, 64, 67; 439/527, 535, 654; 220/3.2, 3.3, 3.4, 3.5, 3.6, 3.7, 3.8; 296/164, 208, 166

(56) References Cited

U.S. PATENT DOCUMENTS

| | | | | |
|---|---|---|---|---|
| 4,643,476 A | * | 2/1987 | Montgerard | 296/24.1 |
| 5,555,643 A | * | 9/1996 | Guasch | 34/443 |
| 5,833,357 A | * | 11/1998 | Ting | 362/378 |
| 5,906,517 A | * | 5/1999 | Crane et al. | 439/654 |
| 5,931,702 A | * | 8/1999 | Fladung | 439/652 |
| 6,042,426 A | * | 3/2000 | Byrne | 439/654 |
| 6,315,617 B1 | * | 11/2001 | Al-Sabah | 439/652 |

* cited by examiner

Primary Examiner—Anthony Dinkins
Assistant Examiner—Anton B Harris
(74) Attorney, Agent, or Firm—Marc J. Luddy

(57) ABSTRACT

A container is provided, including a housing having a plurality of walls that define an inside and an outside of the housing; and at least one dual-sided outlet arranged on at least one of the walls, the dual sided outlet having a first electrical supply point arranged on the inside of the housing and a second electrical supply point arranged on the outside of the housing; wherein each of the first and second electrical supply points is configured to detachably couple to at least one respective electrical appliance, and each of the first and second electrical supply points is configured to provide electrical power to the at least one respective electrical appliance.

11 Claims, 4 Drawing Sheets

DUAL-SIDED ELECTRICAL OUTLET

FIELD OF THE INVENTION

The present invention relates to a dual-sided electrical outlet for providing electrical power to at least one electrical appliance.

BACKGROUND INFORMATION

It is believed that a storage container, such as a storage bin and/or glove compartment of a vehicle, may provide an electrical outlet arranged on the inside of the container for providing electrical power to an electrical appliance. The electrical power may be provided, for example, by a transformer and/or power inverter connected to a car battery and may include, for example, alternating current (AC) or direct current (DC). In this manner, the appliance, for example, a recharging cellular phone, may receive electrical power while stored in the container, without requiring that an otherwise cumbersome external charging cord be extended to the electrical appliance inside the container.

It is also believed that a storage container of the type described above may be provided with an electrical outlet arranged on the outside of the container for providing electrical power to an electrical appliance, for example, a lap-top computer.

However, it is believed that providing a container with both an external and internal electrical outlet may be costly and difficult to manufacture.

SUMMARY OF THE INVENTION

It is an object of the present invention to provide a container with a dual-sided electrical outlet for simultaneously providing electrical power to electrical appliances inside and/or outside the container. Specifically, it is an object of the present invention to provide a container including a housing having a plurality of walls that define an inside and an outside of the housing; and at least one dual-sided outlet arranged on at least one of the walls, the dual sided outlet having a first electrical supply point arranged on the inside of the housing and a second electrical supply point arranged on the outside of the housing; wherein each of the first and second electrical supply points is configured to detachably couple to at least one respective electrical appliance, and each of the first and second electrical supply points is configured to provide electrical power to the at least one respective electrical appliance.

It is another object of the present invention to provide the container described above, in which at least one of the walls includes a lid, the at least one dual-sided outlet being arranged on the lid.

It is still another object of the present invention to provide the container described above, in which the at least one dual-sided outlet includes a plurality of electrical conductors, each of the electrical conductors electrically contacting both the first and second electrical supply points, the electrical conductors providing the electrical power to the first and second electrical supply points.

It is yet another object of the present invention to provide the container described above, in which the electrical power includes an alternating current.

It is still another object of the present invention to provide the container described above, in which the electrical power includes a voltage of 110 and/or 220 volts.

DETAILED DESCRIPTION

Figure 1:
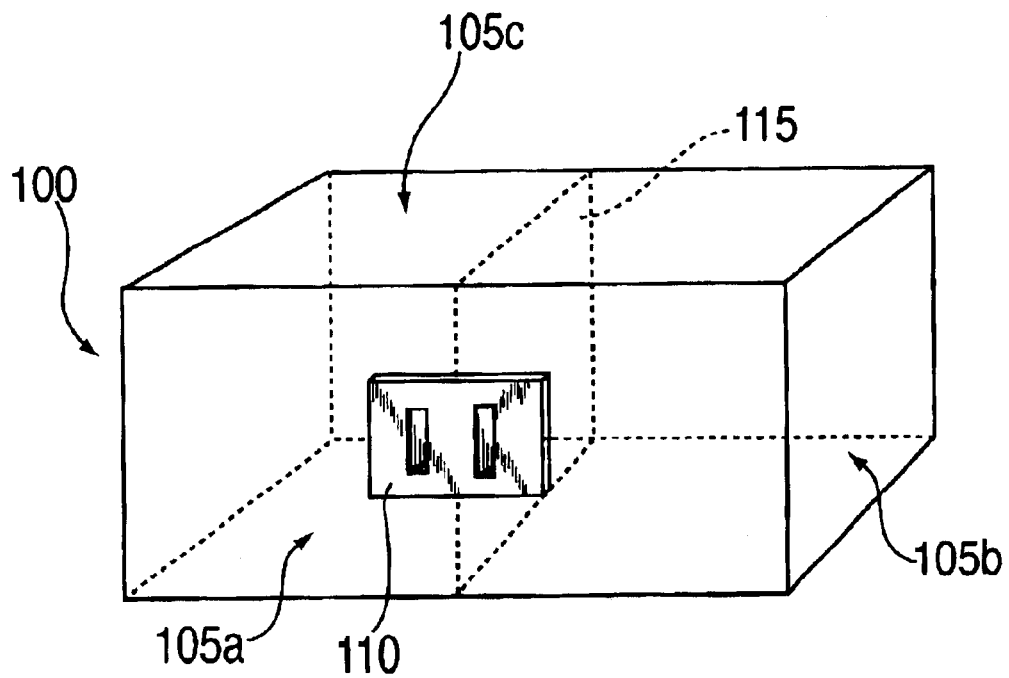
FIG. 1 illustrates an exemplary container according to the present invention.

Referring now to FIG. 1, there is seen an exemplary container 100 according to the present invention. Container 100 includes a plurality of walls 105, of which walls 105a, 105b, and 105c are shown. A dual-sided outlet 110 is provided on wall 105a to provide electrical power, for example, 110 volts of electrical power having an alternating current, to at least one electrical appliance.

It should be appreciated that, although FIG. 1 shows a single dual-sided outlet 110 arranged on wall 105a, container 100 may include more than one dual-sided outlet arranged on any combination of walls 105. For example, container 100 may include one dual-sided outlet on wall 105a and two dual-sided outlets on wall 105b.

Figure 2:
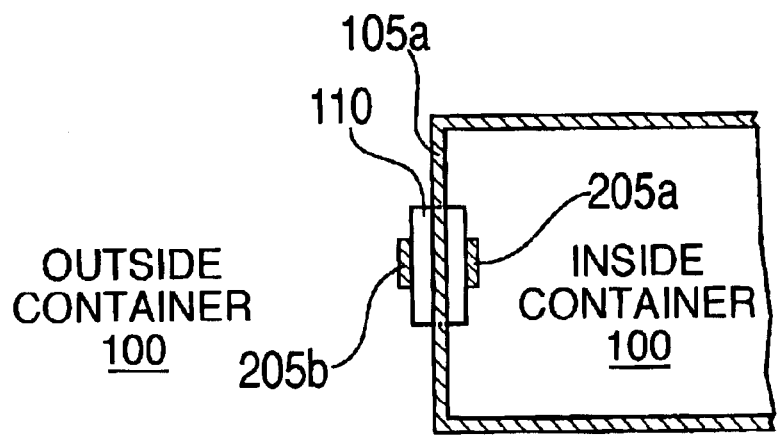
FIG. 2 is a sectional view of the exemplary container illustrated in FIG. 1.

Referring now to FIG. 2, there is seen a sectional view of wall 105a as viewed perpendicular to plane 115 of FIG. 1. As shown in FIG. 2, dual-sided outlet 110 extends through wall 105a and includes a first electrical supply point 205a arranged on the inside of container 100 and a second electrical supply point 205b arranged on the outside of container 100. Each of the first and second electrical supply points 205a, 205b is configured to detachably couple to at least one respective electrical appliance (not shown), and each of the first and second electrical supply points 205a, 205b is configured to provide electrical power to the at least one respective electrical appliance.

Figure 3:
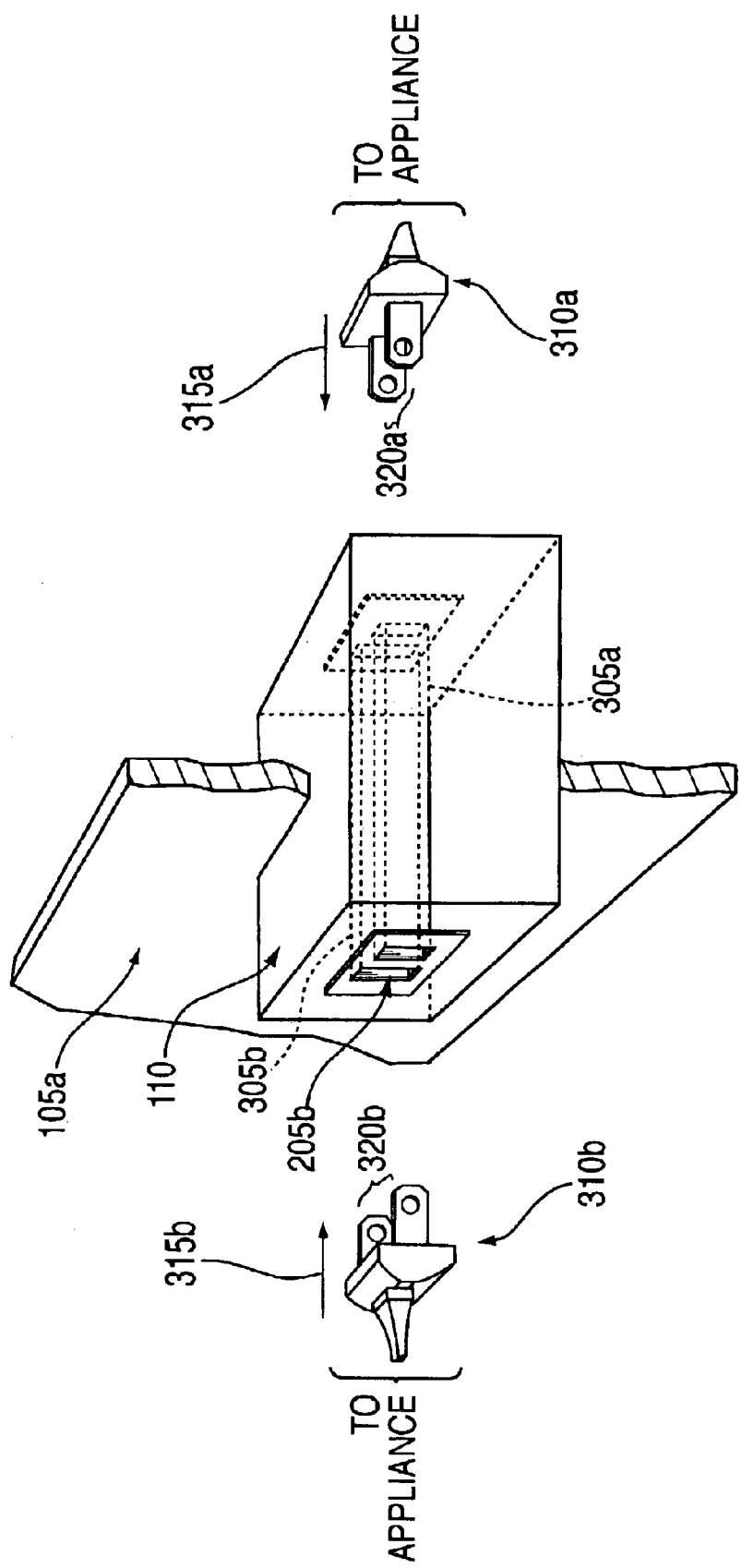
FIG. 3 illustrates an exemplary dual-sided outlet according to the present invention.

Referring now to FIG. 3, there is seen an exemplary dual-sided outlet 110 according to the present invention. As shown in FIG. 3, dual-sided outlet 110 includes conductors 305a, 305b electrically contacting both the first and second electrical supply points 205a, 205b. Conductors 305a, 305b are configured to detachably couple to appliance plugs 310a, 310b for supplying electrical power to at least one electrical appliance (not shown). For this purpose, at least one of appliance plugs 310a, 310b may be inserted into the dual-sided outlet 110 in the directions of arrows 315a, 315b, respectively. Once inserted into the dual-sided outlet 110, the conductors 305a, 305b electrically contact appliance conductors 320a, 320b and supply electrical power to the appliance plugs 310a, 310b via a power cable (not shown), which may be situated within the wall 105a.

It should be appreciated that, although FIG. 3 shows dual-sided outlet 110 including two conductors 305a, 305b for providing power to at least one of two appliance plugs 310a, 310b, dual-sided outlet 110 may, for example, include any number of conductors electrically contacting both the first and second electrical supply points 205a, 205b. In this manner, dual-sided outlet 110 may supply electrical power to any number of appliance plugs, which may be situated inside and/or outside the container 100.

Figure 4:
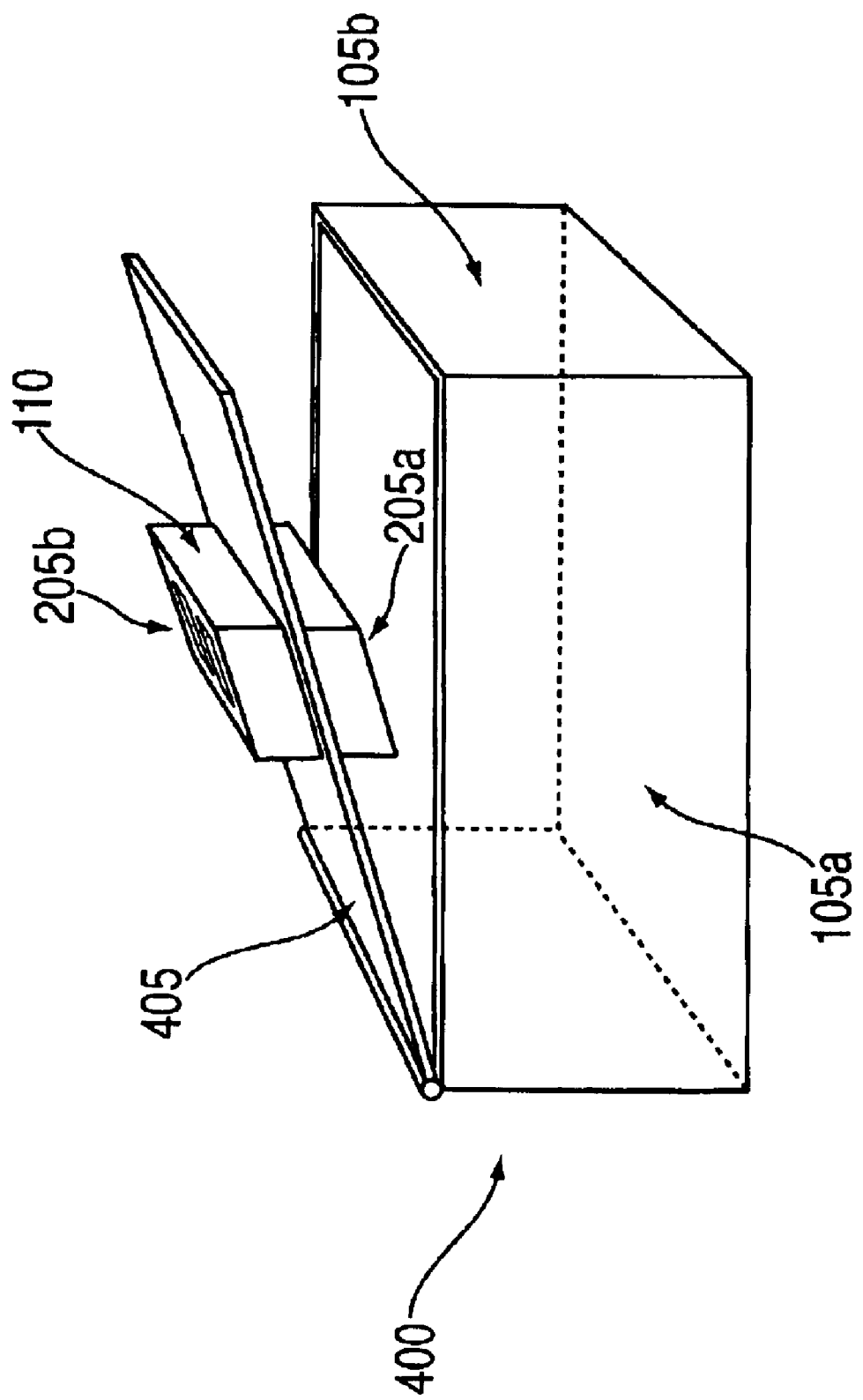
FIG. 4 illustrates another exemplary container according to the present invention.

Referring now to FIG. 4, there is seen another exemplary container 400 according to the present invention. Exemplary container 400 is similar to the exemplary container 100 described above with respect to FIG. 1, except that container 400 includes dual-sided outlet 110 arranged on lid 405 of the container 400, the lid permitting access to the inside of the container 400.

It should be appreciated that, although FIG. 4 shows dual-sided outlet 110 arranged on the lid 405 of the container 400, dual-sided outlet 110 may be arranged on any of the walls 105 of the container, for example, wall 105a and/or wall 105b.

Figure 5:
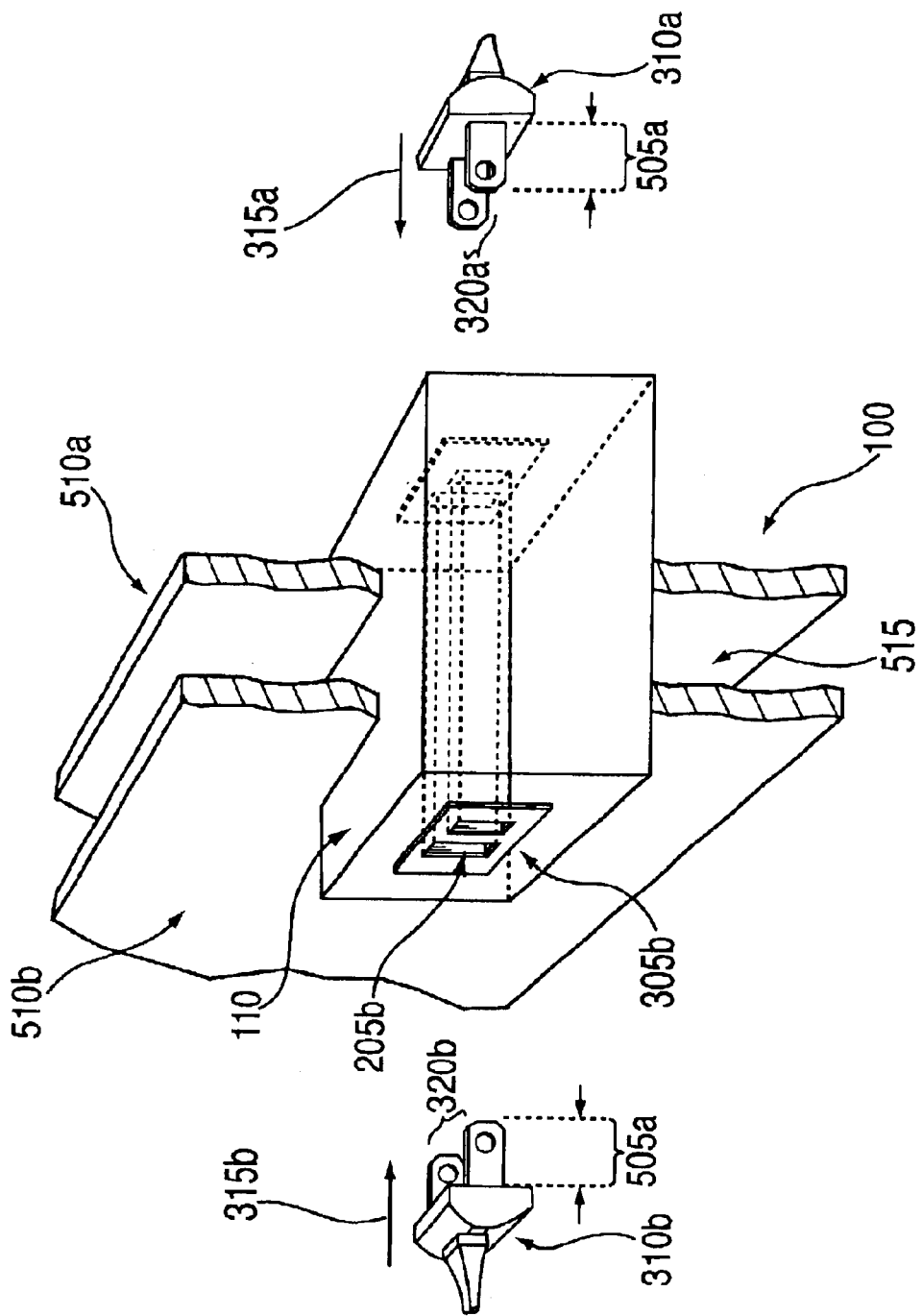
FIG. 5 illustrates another exemplary dual-sided outlet according to the present invention.

Referring now to FIG. 5, there is seen another exemplary 20 dual-sided outlet 110 according to the present invention. In this exemplary embodiment, dual-sided outlet 110 is arranged in a container 100 having an inner wall 510a and an outer wall 510b, each of the walls 510a, 510b being separated by a space 515. Similar to the exemplary embodiment described above with respect to FIG. 3, at least one of appliance plugs 310a, 310b may be inserted into the dual-sided outlet 110 in the directions of arrows 315a, 315b, respectively. Once inserted into the dual-sided outlet 110, electrical power is provided to the appliance plugs 310a, 310b via, for example, a power cable (not shown), which may be situated within the space 515 between walls 510a, 510b.

It should be appreciated that space 515 may separate walls 510a, 510b by a suitably selected distance, such that both appliance plugs 310a, 310b may be inserted into the dual-sided outlet 110, without appliance conductors 320a, 320b contacting each other inside the dual-sided outlet 110. In this manner, both appliance plugs 310a, 310b may be inserted into dual-sided outlet 110 to provide electrical power, for example, to two appliances (not shown).

It should also be appreciated that the electrical supply points 205a, 205b may be designed to be flush with the inner wall 510a and the outer wall 510b, respectively, thereby seamlessly forming part of the container 110. In this manner, the dual-sided outlet 110 may be more aesthetically pleasing.

What is claimed is:

1. A container, comprising:
    a plurality of walls that define an inside space and an outside space; and
    at least one dual-sided outlet operatively connected to an electrical power source and positioned on at least one of said walls, to provide
        a first electrical supply point accessible from said inside space and
        a second electrical supply point accessible from said outside space;
    wherein each of said first and second electrical supply points is configured to detachably connect said electrical power source to at least one electrical appliance.

2. The container according to claim 1, where at least one of said walls is a lid, and said at least one dual-sided outlet is positioned on said lid.

3. The container according to claim 1, where said electrical power source provides alternating current.

4. The container according to claim 3, where said electrical power source provides 110 volts.

5. The container according to claim 3, where said electrical power source provides 220 volts.

6. The container according to claim 1, where at least one of said plurality of walls on which said at least one dual-sided outlet is positioned comprises an inner wall and an outer wall separated by a space.

7. A vehicle, comprising:
    a vehicle body; and
    a container fixedly secured to said vehicle body, said container comprising
    a plurality of walls that define an inside space and an outside space; and
    at least one dual-sided outlet operatively connected to an electrical power source and positioned on at least one of said walls, to provide
        a first electrical supply point accessible from said inside space and
        a second electrical supply point accessible from said outside space;
    where each of said first and second electrical supply points is configured to detachably connect said electrical power source to at least one electrical appliance.

8. The vehicle according to claim 7, where at least one of the walls is a lid, and said at least one dual-sided outlet is positioned on said lid.

9. The vehicle according to claim 7, where said electrical power source provides alternating current.

10. The vehicle according to claim 9, where said electrical power source provides 110 volts.

11. The vehicle according to claim 9, where said electrical power source provides 220 volts.

* * * * *